(No Model.)
G. W. LANGDON.
BREAD CUTTER.
No. 432,628. Patented July 22, 1890.
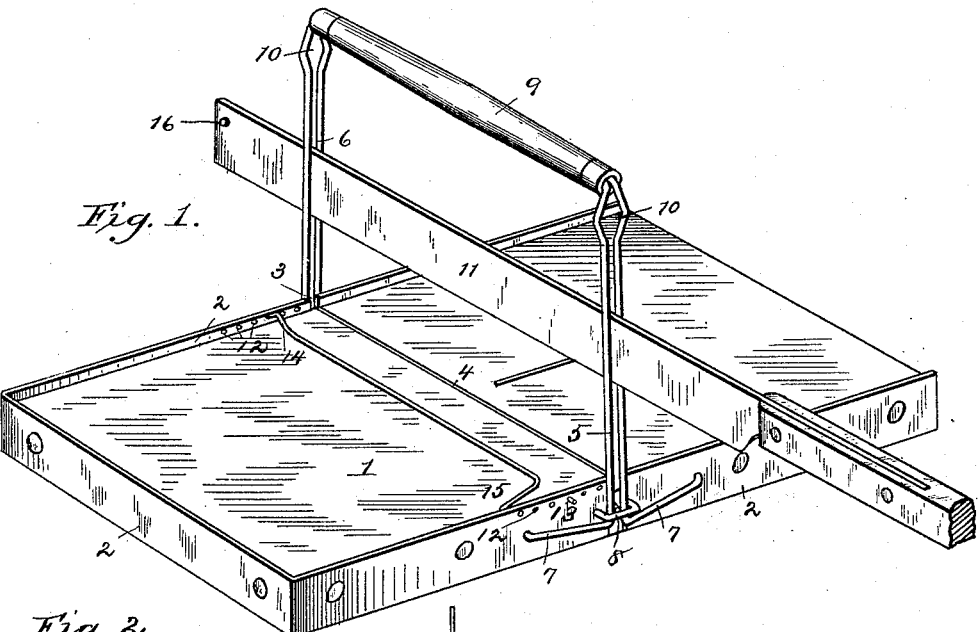
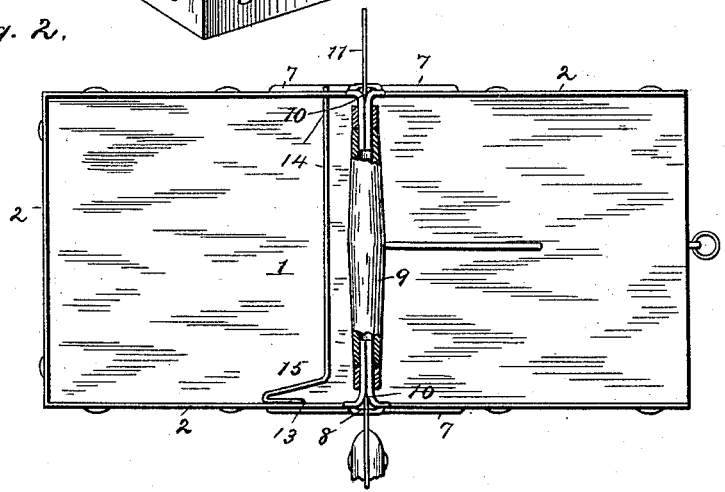
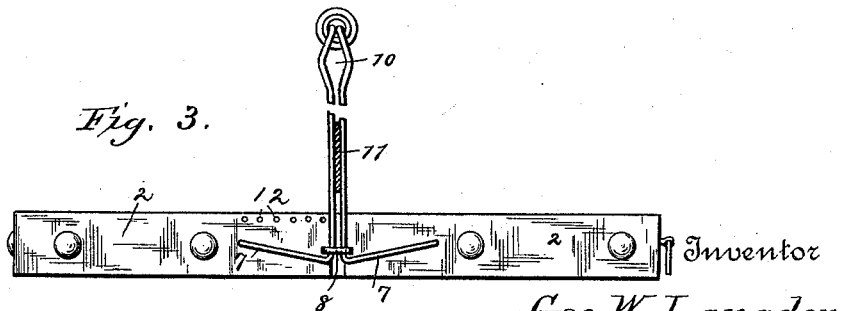
Witnesses
Harry L. Amer.
H. T. Riley.
Inventor
Geo. W. Langdon.
By his Attorneys
C. A. Snow & Co.

UNITED STATES PATENT OFFICE.

GEORGE W. LANGDON, OF MERCER, PENNSYLVANIA.

BREAD-CUTTER.

SPECIFICATION forming part of Letters Patent No. 432,628, dated July 22, 1890.

Application filed February 24, 1890. Serial No. 341,457. (No model.)

*To all whom it may concern:*

Be it known that I, GEORGE W. LANGDON, a citizen of the United States, residing at Mercer, in the county of Mercer and State of Pennsylvania, have invented a new and useful Bread-Cutter, of which the following is a specification:

The invention relates to improvements in bread-cutters.

The object of the present invention is to provide a simple and inexpensive bread-cutter adapted to be readily adjusted to regulate the size of the slices and capable of preventing the crumbs falling from it.

The invention consists in the construction and novel combination and arrangement of parts hereinafter fully described, illustrated in the accompanying drawings, and pointed out in the claims hereto appended.

In the drawings, Figure 1 is a perspective view of a bread-cutter constructed in accordance with the invention. Fig. 2 is a plan view. Fig. 3 is a side elevation.

Referring to the accompanying drawings, 1 designates the base of a bread-cutter, which base is constructed, preferably, of an oblong block of wood and is provided with a metal band 2, that extends around three sides of the base and projects a sufficient distance above the same to prevent crumbs falling from the base, and is provided with slots 3, that are oppositely arranged and register with a slight groove 4, extending transversely across the base about midway the length of the same to receive the edge of a knife and enable the same to cut entirely through a loaf of bread. The knife is guided in its vertical movements by a wire frame, which consists of a pair of vertical wires 5 and 6, that are similar and have their lower ends 7 bent horizontally and secured to the sides of the base. The pairs of wires are prevented spreading by staples 8, that straddle the wires just above their bends. The upper ends of the wires are suitably secured in a handle 9, that is provided at its ends with ferrules to strengthen it at the points where it receives the wires, and it affords a ready and convenient means for carrying the bread-cutter. The wires are provided with oppositely-arranged bends 10, that are arranged just below the handle to enable the knife to be readily inserted between the wires that are arranged sufficiently apart to allow the knife to be readily moved vertically, and the said knife 11 is provided near its outer end with a stud 16, that projects upon opposite sides and is adapted to engage the sides of the frame and prevent the knife being accidentally withdrawn from between the wires. The edges of the band 2 are provided upon opposite sides of the base with series of registering perforations 12, that are designed to receive the ends of a wire guide 13, that may be adjusted to and from the frame to regulate the thickness of a slice. The wire 13 is provided with a vertical bend 14, that is adapted to engage the bread and stop the same, and a horizontal bend 15, that lies upon the base and prevents the bend 14 being pushed from its vertical position while arranging the loaf below the knife, and the said bend 15 also enables the adjacent end of the wire guide to be readily withdrawn from the perforations of the band.

From the foregoing description and the accompanying drawings the construction, operation, and advantages of the invention will readily be understood, and the cutter is designed to be provided at one end with a ring to enable it to be hung up when not in use.

What I claim is—

1. The combination, in a bread-cutter, of the base, the band secured around the sides of the base and projecting above the same and provided with a series of registering perforations on each side of the base, and the guard having its ends arranged to engage the perforations to regulate the thickness of a slice, substantially as described.

2. The combination, in a bread-cutter, with the knife provided at the end of the blade with a stud 16, projecting from both sides of the same, of the base, the wire frame forming a guide for the knife and consisting of the similar pairs of vertical wires having their lower ends secured to the base and provided near their upper ends with outward bends, forming openings to enable the knife to be readily inserted, and the transverse handle receiving the upper ends of the wires, substantially as described.

3. In a bread-cutter, the combination of the base, the band projecting above the base and provided with registering perforations on each side, the wire frame secured to the base and having the handle connected thereto, and the wire guard with the ends adapted to engage the perforations and provided with a vertical bend 14 and a horizontal bend or loop 15, substantially as and for the purpose described.

In testimony that I claim the foregoing as my own I have hereto affixed my signature in presence of two witnesses.

GEORGE W. LANGDON.

Witnesses:
H. H. ZEIGLER,
A. H. McELRATH.